Dec. 15, 1953 N. A. DIMMOCK 2,662,553
GASEOUS FLUID FLOW SYSTEM
Filed June 15, 1951 2 Sheets-Sheet 1

Inventor,
Normal Albert Dimmock
By
Stevens, Davis, Miller & Mosher
his Attorneys Patented Dec. 15, 1953

2,662,553

UNITED STATES PATENT OFFICE 2,662,553

GASEOUS FLUID FLOW SYSTEM

Norman Albert Dimmock, Woking, England, assignor to Power Jets (Research and Development) Limited, London, England, a British company Application June 15, 1951, Serial No. 231,876

Claims priority, application Great Britain June 22, 1950

6 Claims. (Cl. 138—37)

This invention relates to duct elbows for gaseous fluid flow systems such as may form, for example, a part of the ducting connecting two components of a gas turbine power plant.

In general, such duct elbows give rise in operation to losses in the fluid flowing therethrough. These losses are manifested by a substantial diminution of the velocity head of the fluid flowing round the duct elbow and vary substantially over the cross-section of the duct, being greatest in the case of a simple duct elbow comprising solely abutting upstream and downstream duct sections near the inside wall of the elbow. (By this and hereinafter occurring references to the inside wall of the elbow is meant that wall of the elbow which, in a cross section of the elbow in a plane through both duct sections, includes externally of the duct an angle less than 180°, the outer wall of the elbow being that including an external angle greater than 180°.)

A general object of the invention is to provide an improved duct elbow tending to reduce such losses and distribute them substantially evenly over the cross-section of the duct so affording a substantially even fluid velocity at cross-sections downstream of the elbow. A further object of the invention is to provide a compact low loss duct elbow of a simple and accordingly easily manufactured structural form.

It is known that, by dispersing an aligned series of parallel blades along the plane bisecting the angle of the elbow formed by two intersecting straight duct sections, the losses aforementioned may be reduced and more evenly distributed as compared with an elbow having no such blades. However, the effectiveness of the blade in this respect is considerably influenced by their shape and position. Furthermore, various individual features of the blade shape and position known in themselves to have usually a beneficial effect are influenced by other features of shape and position necessarily present in any particular arrangement.

The present invention is concerned with a combination of features of blade shape and position found collectively to be particularly conducive to the fulfilment of the objects aforementioned.

The invention is carried out by providing blades which, firstly, are successively spaced along the elbow-angle bisecting plane at distances related substantially in arithmetic progression, the least distance being in the space between the inner wall of the elbows and the blade next adjacent thereto; which, secondly, are made of sheet material curved to have a common cross-section throughout the length of each blade and the same for all blades, which common cross-section is a parabolic arc whose radius of curvature increases progressively from its leading edge to its trailing edge and which arc subtends an angle greater by a small proportion (e. g. of the order of 10%) than the angle of the elbow; and in which, thirdly, the said leading and trailing edges of the common blade cross-section are each inclined toward the inside wall of the elbow of respectively the upstream and downstream duct sections, but said inclination of the leading edge is less than the said inclination of the trailing edge. Preferably the inner corner at least of the duct elbow is provided over the region thereof coextensive in the direction of flow with the row of blades with a smoothly curved elongate fillet extending longitudinally parallel to the blade of the series.

The invention may be best understood with reference to the accompanying drawings in which a preferred constructional embodiment thereof is illustrated.

Figure 1:
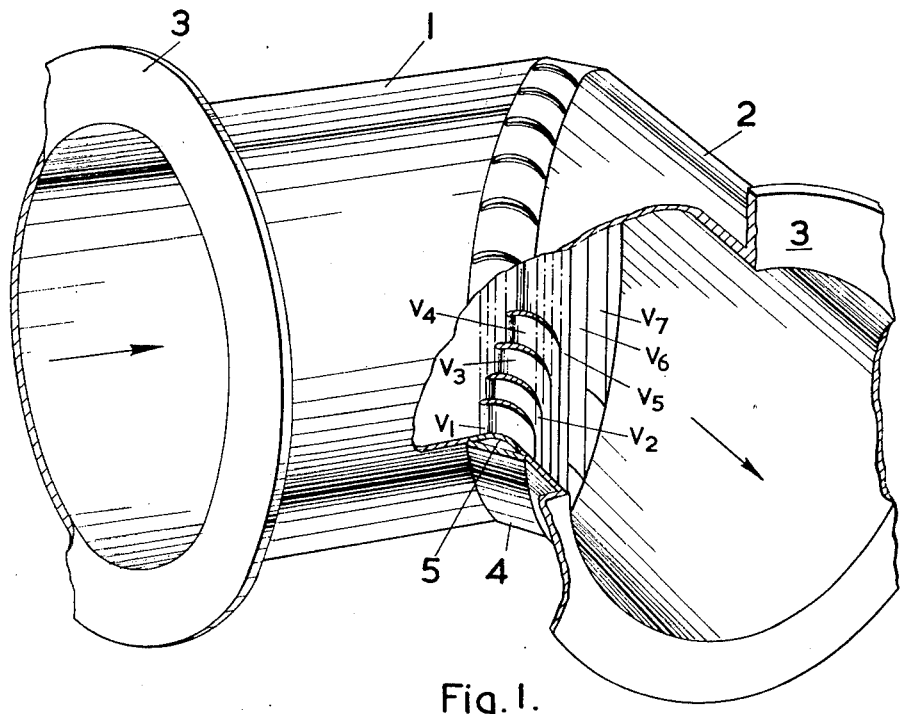
Figure 1 is an isometric view, partly sectioned for clarity, of a duct elbow embodying the invention.

In Figure 1, the upstream and downstream duct sections 1 and 2 respectively are of the same diameter and have their axes at right angles. The direction of fluid flow through the duct is indicated by the arrows. Each duct section has a joint flange 3 at one end and terminates at its other end in an oblique plane at 45° to its axis, the respective planes of the two sections being parallel and spaced a short distance apart. A continuous elliptical shroud 4 of uniform widths is disposed between the end planes of the duct sections and is attached to each section. A row of similarly sectioned parallel blades, $V_1$, $V_2$, $V_3$, etc., of curved sheet metal are affixed within the shroud 4, some of the blades being shown, for clarity, as terminating in the plane of bending of the elbow (i. e. the plane common to the axes of both duct sections) although the blades in fact extend across the duct. A curved fillet piece 5 is included at the inside corner of the elbow so as to form with the blade $V_1$ immediately adjacent thereto a passage of smoothly changing width, the passage width diminishing in the direction of fluid flow therethrough.

Figure 2:
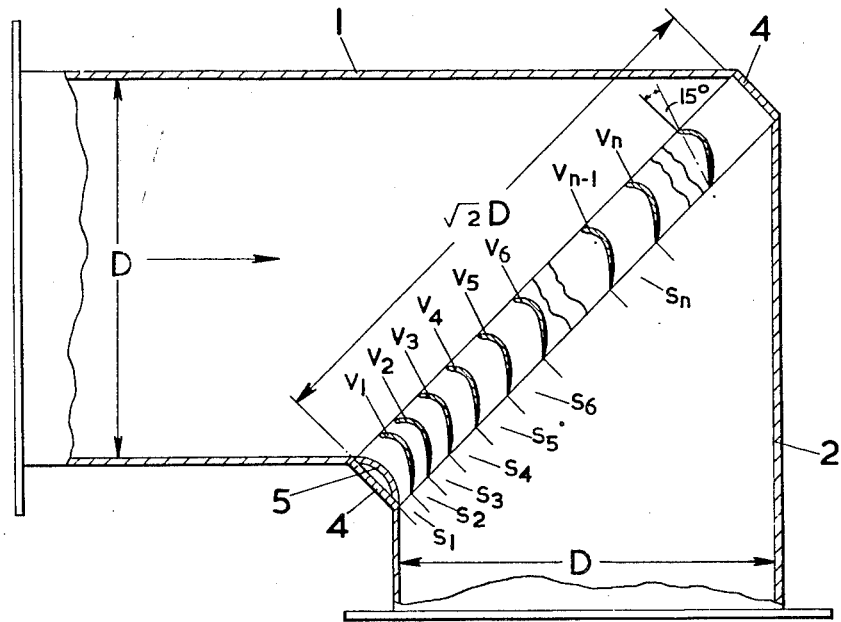
Figure 2 is a sectional plan of the elbow of Figure 1.
Figure 3:
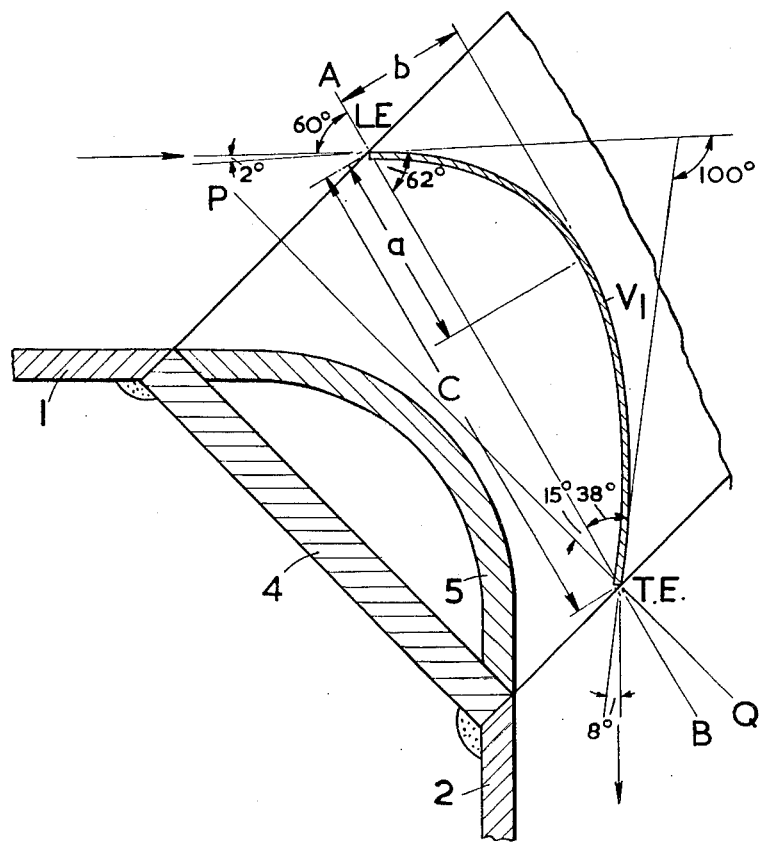
Figure 3 is a scrap view to an enlarged scale of a part of the sectional plan of Figure 2.
Figure 4:
Figures 4a and 4b are scrap views to a still larger scale of parts of the view of Figure 3.

The various features of shape and position of the blades are shown more clearly in Figures 2 and 3, D being the width of the duct in inches in the plane of bending of the elbow. The cross-section of the blades, $V_1$, $V_2$, $V_3$, etc., exemplified by that of $V_1$ in Figure 3 has a chord C and has the form of a parabolic arc which subtends an angle of 100° as shown in the figure. The chord C measured in inches is related to the duct width D by the equation $$C = \frac{D+10}{8}$$

while the distance, $a$, from the leading edge LE of the vane, of the position of maximum camber, and its amount, $b$, are respectively 0.4 C and 0.28 C. Each vane is radiused at its leading edge as shown in cross section in Figure 4a and chamfered at its trailing edge, as shown in Figure 4b, for a distance of at least 0.25 C, to a "knife edge."

The vanes $V_1$, $V_2$, $V_3$, etc., of a total number, N, determined by equation $$N = \frac{2.6D}{C} - 1$$

(taken to the nearest integer), are spaced at distances $S_1$, $S_2$, $S_3$, etc. (measured at their trailing edges), varying in arithmetical progression, $S_1$ being the smallest distance at the inside of the corner and equal to 0.3 C, and the constant difference in inches of the arithmetical progression, $\Delta$, being given by the formula:

$$\Delta = \frac{\frac{2.83D}{N+1} - 2S_1}{N}$$

the spacing in inches between or pitch, $S_n$, of any two vanes $V_{n-1}$ and $V_n$ being given by $$S_n = S_1 + (n-1)\Delta$$

The cross-section of the blades (see Figure 3) is such that the leading and trailing edges thereof, LE and TE, are inclined to the chord line AB (that is the line passing through the leading and trailing edges) at angles of 62° and 33° respectively. The blades are positioned so that the chord line AB is at 15° to the line PQ which is itself normal to the bisecting plane of the angle of the elbow. The effect of this is that the leading edge LE of the blade section is inclined toward the inner wall of the upstream duct section 1 at an angle of 2° while the trailing edge TE is inclined toward the inner wall of the downstream duct section 2 at an angle of 8°.

In manufacturing the duct elbow, the blades $V_1$, $V_2$, etc. are conveniently rolled from a strip or strips of sheet material to the required curvature. The shroud 4 comprises a narrow strip of material bent to an elliptical form and joined at its ends. The upstream and downstream duct sections 1 and 2 are fabricated from sheet material in the conventional way. The duct elbow is then assembled in the following manner. Firstly the two ducted sections are welded to the cascade shroud 4 and the circular arc fillet vane 5, forming the inside of the corner, is fitted and welded in position; the interior of the corner in the region of the welds is cleaned up (for example by hand grinding) to afford smooth, continuous, internal surfaces. The positions of the profiles of the blades are then marked out and the cascade shroud slotted to receive them. Finally the blades are inserted in slots, welded at the external surface of the cascade shroud and trimmed up. The result is a neat and efficient corner with no rough welding on any internal surface. The fillet at the outside of the corner is afforded solely by the cascade shroud as the manufacturing complexity of fitting an arcuate fillet is found not to be justified, for all normal purposes, by the resultant small gain in performance.

While the foregoing description has referred to an elbow in a duct of circular section, the details of shape, size and positioning of the blades included therein have been applied to elbows of ducts of rectangular sections, D being taken as the width in inches of the duct in the plane of bending of the elbow, when the magnitude and distribution of the losses associated with the elbow have been comparable with those of the circular duct elbow described. Accordingly the various formulae in the description may be regarded as not restricted in their application solely to circular duct elbows.

What I claim is:

1. The combination with a fluid duct comprising two straight duct sections, respectively an upstream section and a downstream section, meeting at an angular elbow, of a series of parallel elongated blades substantially aligned along a plane bisecting the angle of the elbow and successively spaced one from another at distances related substantially in arithmetic progression with the least distance toward the inside wall of the elbow, each of said blades extending lengthwise across said duct and comprising a single elongated sheet member of curved cross-section substantially constant over the blade length and common to each blade, said common blade cross-section being approximately a parabolic arc which subtends an angle greater by a small proportion (e. g. of the order of 10%) than the angle of the elbow and whose radius of curvature increases progressively from the leading edge to the trailing edge of the blade section, said leading and trailing edges being inclined toward the inside wall of the elbow of respectively said upstream and downstream duct sections, said leading edge being more nearly aligned with respect to said wall of the upstream duct section than is said trailing edge with respect to said wall of the downstream duct section.

2. The combination according to claim 1, wherein said common blade cross-section has a chord C, measured in inches which is approximately related to the width D, in inches of the duct, in the plane of the elbow by the formula:

$$C = \frac{D+10}{8}$$

3. The combination according to claim 2 wherein the number, N, of blades in said series is determined by the formula:

$$N = \frac{2.6D}{C} - 1$$

taken to the nearest integer.

4. The combination according to claim 3, wherein the blade of said series nearest the inside wall of the downstream duct section of the elbow is spaced at a distance of 0.3 C from said wall and the distances between adjacent pairs of blades of said series taken successively from said blade are progressively greater for each successive pair of blades by an amount approximately equal to $$\frac{\frac{2.83D}{N+1} - 0.6C}{N}$$

inches, all distances being measured at the trailing edges of the blades parallel to the plane bisecting the angle of the elbow.

5. The combination according to claim 1 wherein, in said common blade cross-section, said leading edge thereof is inclined toward the inside wall of said upstream duct section of the elbow at an angle of approximately 2.0° while the trailing edge thereof is inclined toward the inside wall of said downstream duct section of the elbow at an angle of approximately 8.0°.

6. The combination according to claim 1, the angle of the elbow being a right angle, wherein said parabolic arc of said common blade cross-section has its maximum camber at a point approximately 0.4 of its chord from the leading edge of the section, and the amount of the maximum camber is approximately 0.25 of said chord.

NORMAN ALBERT DIMMOCK.

References Cited in the file of this patent

UNITED STATES PATENTS

| Number | Name | Date |
|---|---|---|
| 1,996,596 | Smith | Apr. 2, 1935 |

FOREIGN PATENTS

| Number | Country | Date |
|---|---|---|
| 987,477 | France | Apr. 18, 1951 |